United States Patent [19]

Toyoda et al.

[11] Patent Number: 4,487,492

[45] Date of Patent: Dec. 11, 1984

[54] ELECTROMAGNETICALLY CONTROLLED SHUTTER

[75] Inventors: Yasuhiro Toyoda; Masayuki Suzuki; Masayoshi Yamamichi, all of Kanagawa, Japan

[73] Assignee: Canon Kabushiki Kaisha, Tokyo, Japan

[21] Appl. No.: 453,941

[22] Filed: Dec. 28, 1982

[30] Foreign Application Priority Data

Jan. 7, 1982 [JP] Japan .................................. 57-1492

[51] Int. Cl.³ .......................... G03B 9/08; G03B 9/40
[52] U.S. Cl. .................................. 354/234.1; 354/246
[58] Field of Search ....................... 354/234.1, 245-249

[56] References Cited

U.S. PATENT DOCUMENTS 3,646,869  3/1972  Arai ................................... 354/234.1
4,160,983  7/1979  Inagaki et al. .................... 354/234.1

Primary Examiner—L. T. Hix
Assistant Examiner—Douglas S. Lee
Attorney, Agent, or Firm—Toren, McGeady and Stanger

[57] ABSTRACT

An electromagnetically controlled shutter with a latch member held in an active position by an electromagnet containing a permanent magnet and operating upon de-magnetization of the electromagnet to release the shutter. To prevent reduction of the attractive force by the adhesion of dust, oil or the like to the attracting surface of the electromagnet and also to improve the ramping characteristics of the shutter, an arrangement is provided such that when the electromagnet is de-energized, the shutter latching member is pulled away from the electromagnet by a breakaway spring. Then the breakaway spring impels the shutter to run down in an early stage, and loses its impelling force. Soon after that, the shutter latching member is returned to the attracted position by an attracting spring.

1 Claim, 4 Drawing Figures

ELECTROMAGNETICALLY CONTROLLED SHUTTER

BACKGROUND OF THE INVENTION

1. Field of the Invention

This invention relates to electromagnetically controlled shutters.

2. Description of the Prior Art

In the art of electrically operated shutters of the type having the a latch member cooperative with the armature of an electromagnet so that the shutter is latched in the charged position by the attractive force of the electromagnet, and whereas when the armature moves away from the electromagnet as the electromagnet is de-magnetized, the shutter is released, it is generally known that when finely-divided particles or oil drops are adhered to the confronting surfaces of the yoke of the electromagnet and the armature, the attraction of the armature becomes insufficient or impossible and the shutter does not work normally. To avoid this, the armature has to be arranged to return to the initial attracted position as soon after its movement away from the yoke as possible. In the prior art there is known a shutter in which the returning of the armature is controlled by a signal indicating that the trailing curtain of the shutter has run down. With such a shutter, however, when making a long exposure with a slow speed shutter or bulb, the armature is left away from the yoke during the entire exposure time. Therefore, the probability of adhesion of dust or oil is very high. In this respect, it cannot be said that the above-stated aim is fully achieved.

It is also known to provide another arrangement adapted to be used in a single lens reflex camera such that the armature is returned when the drive member for the reflex mirror and automatic diaphragm returns, as disclosed in Japanese Utility Model Application No. Sho 47-34094.

Since, however, in of these arrangements there is no attractive force during the time that the electromagnet is not energized, there is a need for making use of a retaining mechanism for holding the armature in contact with the yoke against the breakaway spring until just before the start of running down movement of the shutter and a reset mechanism responsive to the signal representing the completion of the movement of the trailing curtain for resetting the armature. In addition thereto it is difficult to finely adjust the spring. For these reasons, conventional shutters have drawbacks in that the shutter mechanism becomes complicated with an increase in the space which it occupies, and that the production cost is unavoidably increased.

On the other hand, in a focal plane shutter wherein the curtains are driven to run down by the force of the springs another aspect is involved in that the speed of movement of the shutter curtain is, because of its dependence upon the inertia and friction of the actuator and the curtain itself, slow in the early stage and increases as running goes on. In a focal plane shutter having leading and trailing curtains with such running characteristics, it is difficult to provide assurance that the entire area of the picture frame is uniformly exposed.

To eliminate this drawback, an arrangement may be provided wherein the preliminary movement of the shutter curtain is elongated so that until the slit-forming border of the shutter curtain reaches the exposure aperture, the running apeed is sufficiently raised. In this case, however, a drawback arises in that the space occupied by the shutter increases.

SUMMARY OF THE INVENTION

An object of the present invention is to provide an electromagnetically controlled focal plane shutter which overcomes the two problems described above simultaneously without increasing the space occupied by the shutter.

In the present invention, the release control makes use of an electromagnet equipped with a permanent magnet whereby latching of the shutter is carried out by the magnetic force of the permanent magnet attracting the armature. During release of the shutter, the coil of the electromagnet is supplied with current to produce a magnetic force of such polarity so as to cancel out the magnetic force of the permanent magnet. Then, a breakaway spring acting between the shutter and the armature moves the armature away from the permanent magnet to release the latching connection. The remaining force of the breakaway spring then assists in accelerating the start of movement of the shutter so that the speed of the running down movement of the shutter is rapidly increased. When the power of the breakaway spring is lost, another or attracting spring acts to return the armature to the initial or attracted position.

The use of an such arrangement provides a very short period during which the armature is allowed to lie away from the attracting surface of the magnet so that the amount of dust or foreign particles adhered thereto is limited to a minimum and so that the running characteristic of the shutter curtain is greatly improved. Thus, it is made possible to obtain a shutter of high accuracy and reliability.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DESCRIPTION OF THE PREFERRED EMBODIMENT

Figure 1:
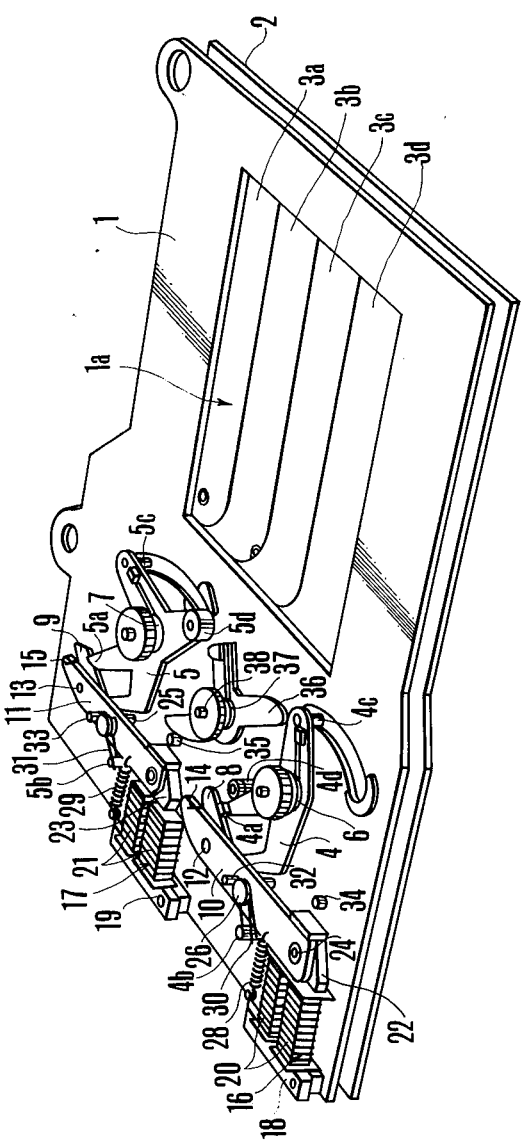
FIG. 1 is a perspective view of an embodiment of a shutter according to the present invention.
Figure 2:
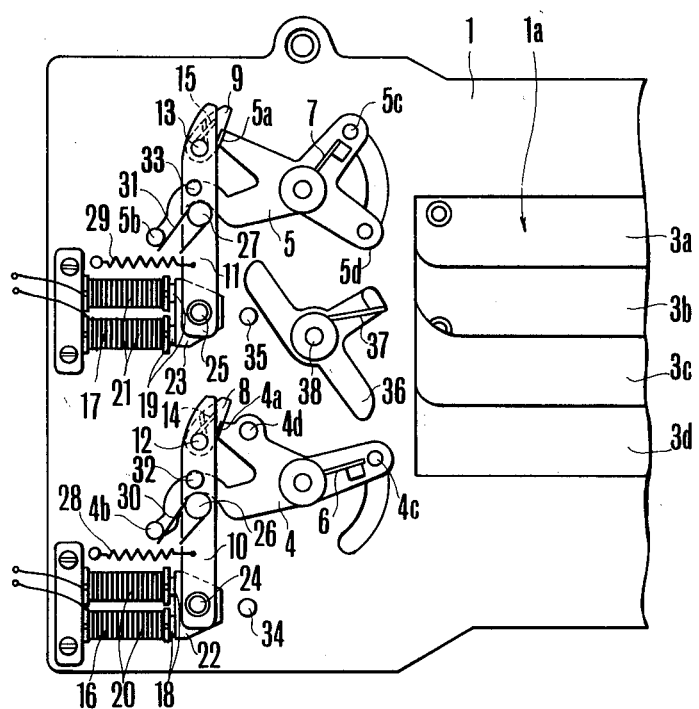
FIG. 2 is an elevational view, partly in broken form, of the shutter in the charged position.

FIG. 1 illustrates a blade type focal plane shutter employing one form of the present invention with its charged position being clearly illustrated in FIG. 2.

In FIGS. 1 and 2, a base plate 1 for the shutter has an exposure window 1a at almost a central portion of the area thereof. A cover base plate 2 is mounted in spaced relation to the first base plate 1 by a certain distance and has an exposure window (not shown) in alignment with the window 1a. Between these two base plates 1 and 2 are positioned leading blades and trailing blades, and as disclosed in U.S. Pat. No. 4.024,555, they operate to open and close the exposure windows by operation of a link mechanism known to those skilled in the art. 3a, 3b, 3c and 3d are blade elements constituting a leading curtain, while those constituting a trailing curtain are not seen in the drawings being located behind the base plate 1. It is also to be noted that the individual blades of the leading and trailing curtains are made of a titanic substance or plastics for the purpose of reducing the moving mass and the drive torque thereof with the aim being to minimize the actuating force on the latch pawl as will be described hereinafter.

A leading curtain drive lever 4 is urged by a spring 6 to turn in a clockwise direction and has a first arm on the upper surface of which is provided a projected or engaging portion 4a, a second arm on the upper surface of which is a pin 4b to engage an armature pull-away spring to be described later, and a third arm on the lower surface of which is a drive connection pin 4c engaging a leading curtain drive arm (not shown), the first arm further carrying a charge pin 4d on the lower surface thereof.

10 is a latch lever for the leading curtain pivotally mounted on a shaft 26 and carrying a pawl lever 8 rotatable about a pivot pin 12 on one end thereof, the pawl lever 8 being urged by a spring 14 to turn in a clockwise direction and its rotation being limited by a stopper (not shown) to such a range as to engage the projected portion 4a of drive lever 4.

A trailing curtain drive lever 5 has four arms of which the end portions carry respectively an engaging member 5a, a member 5b on which an armature pull-away spring 31 reacts, a drive connection pin 5c acting on a trailing drive arm (not shown), and a charge pin 5d for the trailing curtain drive lever 5, these parts being arranged similarly to that for the leading curtain drive lever 4.

11 is a trailing curtain latch lever rotatable about a shaft 27 likewise as the leading curtain latch lever and carrying at one end thereof a pawl lever 9 which is pivotally mounted on a shaft 13 and urged by a spring 15 to turn in a clockwise direction, the range of movement of lever 9 being limited by a stopper (not shown) likewise as the above-described pawl lever 8.

A leading curtain control electromagnet 16 and a trailing curtain control electromagnet 17 are both in the form of a permanent magnet-equipped solenoid. 18 and 19 are pairs of yokes made of permanent magnets. 20 and 21 are pairs of solenoids which upon energization operate to cancel out the magnetic force of the permanent magnets. 22 and 23 are armatures mounted respectively on one of the ends of shutter curtain latch levers 10 and 11 so as to be rotatable about pivot pins 24 and 25 respectively.

The shutter curtain latch levers 10 and 11 are as has been stated above rotatable about the shafts 26 and 27 and, when the solenoids 20 and 21 are not energized, they assume the positions of FIG. 2 where the armatures 22 and 23 are attracted to the permanent magnets 18 and 19. 28 and 29 are armature attracting springs urging the levers 10 and 11 to turn in a clockwise direction.

30 and 31 are armature pull-away springs which generate a force weaker than the sum of the forces of the aforesaid permanent magnets and armature attracting springs, but stronger than the above-described attracting springs with their central portions being convoluted on the respective shafts 26 and 27, one of their ends abutting on the latch lever 10 and 11, and their opposite ends extending into the paths of movement of the pins 4b and 5b on the shutter drive levers 4 and 5 so that when the shutter charging nears the end, power is stored by the rotation of the levers 4 and 5.

36 is a charge lever pivotally mounted on the shutter base plate 1 by a shaft 38 and urged by a spring 37 to turn in a counterclockwise direction. Two arms of this charge lever 36 extend so as to be engageable with the charge pins 4d and 5d on the leading and trailing curtain drive levers 4 and 5 respectively.

34 and 35 are stoppers limiting rotation of latch levers 10 and 11, and the stopper 35 also serves as a stopper limiting rotation of the charge lever 36.

Next an explanation is provided of the operation of the shutter of such construction.

Figure 3:
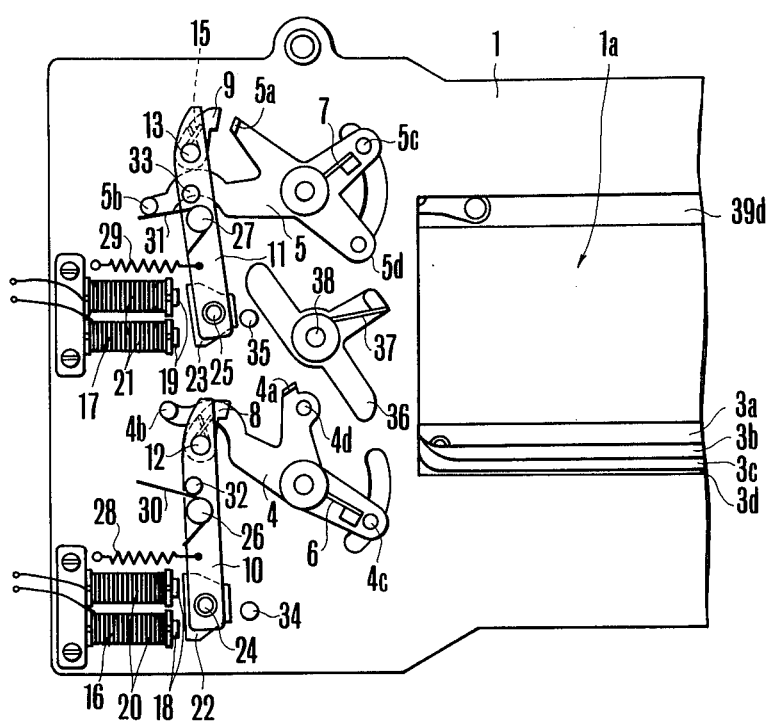
FIG. 3 is similar to FIG. 2 except that an intermediate running position of the shutter is illustrated.
Figure 4:
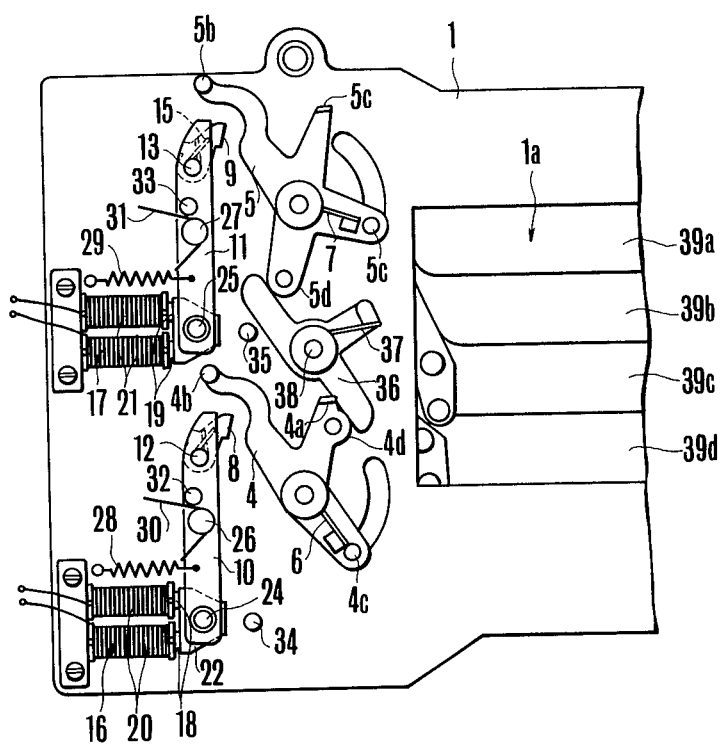
FIG. 4 is similar to FIG. 2 except that the shutter blades have run down.

FIG. 2 illustrates the charged position of the shutter, FIG. 3 a shutter slit during run down, and FIG. 4 the exposure aperture closed position after the shutter has run down.

With the shutter in the charged position, the latch levers 10 and 11 take the positions of FIG. 2 since the armatures 22 and 23 are attracted to the electromagnets 16 and 17, and the leading and trailing curtain drive levers 4 and 5 rest with their extensions 4a and 5a engaging the pawled portion of the pawl levers 8 and 9 respectively.

As a release is actuated, when a control circuit (not shown) supplies current to the leading curtain control electromagnet 16 or solenoid 20, the magnetic force of the permanent magnet or yoke 18 disappears, permitting the pull-away spring 30 to move the armature 22 from the yoke 18, as the latch lever 10 turns in the counterclockwise direction. In a certain angle of rotation of this leading curtain latch lever 10, the pawl lever 8 is disengaged from the extension 4a' of the leading curtain drive lever 4, causing the leading curtain drive lever 4 to start rotation in the clockwise direction. Since, at this time, the leading curtain drive lever 4 receives the force of the leading curtain drive spring 6 plus the force of the armature pull-away spring 30 as the clockwise back-up force, the acceleration of rotation of the leading curtain drive lever 4 becomes very steep. Such rotation is transmitted through the drive connection pin 4c to the leading curtain drive arm (not shown) and therefrom further to move the individual divided blades 3a, 3b, 3c and 3d of the leading curtain downward as viewed in the drawings, opening the exposure window 1a to initiate an exposure. Since the pull-away spring 30 will with its one arm push the pin 4b thereby gradually opening, that arm will touch the pin 32 on the lever 10 and it will thereby be hindered from opening further, the pin 4b will no longer be driven. Thus the force impelling the drive lever 4 and also turning the latch lever 10 vanishes. Therefore, the leading curtain latch lever 10 is then turned in the clockwise direction by the armature attracting spring 28. As the current supply to the electromagnet 16 has already been cut off, the permanent magnet or yoke 18 attracts the armature 22.

In a given time from the start of current supply to the leading curtain control electromagnet 16, the solenoid 21 of the trailing curtain control electromagnet 17 is energized, whereby the armature 23 is pulled away from the yoke 19 by the force of the spring 31. In a manner similar to that described above in connection with of the leading curtain, the latch lever 11 turns in the counterclockwise direction to disengage the pawl lever 9 from the trailing curtain drive lever extension 5a. Then the trailing curtain drive lever 5 turns in the clockwise direction so that the trailing blades 39a, 39b, 39c and 39d start to run down and close the window 1a, terminating the exposure.

During the time when the trailing curtain is running down, it also occurs as in the case of the leading curtain that the armature pull-away spring 31 serves to back up the trailing curtain drive lever 5 and is then exchanged by the armature attracting spring 29 to effect returning of the armature 23 to the yoke 19.

After this exposure has been completed, it is from the position of FIG. 4 that the camera is wound up. Responsive to this, the charge lever 36 turns about the shaft 38 in the clockwise direction. Such motion of lever 36 causes its arms engaging the pins 4d and 5d on the leading and trailing curtain drive levers 4 and 5 respective to turn the levers 4 and 5 in the counterclockwise direction while charging the drive springs 6 and 7 and at the same time returning the leading and trailing curtains to the initial positions.

When this charging operation nears the end, the pins 4b and 5b on the drive levers 4 and 5 come into engagement on one of the arms of the armature pull-away springs 30 and 31 and move the latter round the shafts 26 and 27 in the counterclockwise direction. It is to be noted here that since, at this time, the armatures are held in the attracted positions by the magnetic forces of the permanent magnets, the latch levers 10 and 11 are not caused to turn and therefore that the springs 30 and 31 are tensioned to store the power. Then when the extensions 4a and 5a of the drive levers 4 and 5 strike the pawl levers 8 and 9, the pawl levers are turned about the pins 12 and 13 in the counterclockwise direction to escape. After the extensions 4a and 5a have passed, the pawl levers 8 and 9 return under the action of the springs 14 and 15 and their pawls catch the extensions 4a and 5a. Thus the winding operation terminates.

As has been described in greater detail above, the present invention makes use of a permanent magnet as the shutter curtain control electromagnet in constructing an electromagnetically controlled shutter in the release form. Therefore, when the shutter is actuated by the electrical signal for pulling the armature away from the yoke, the period of actuation of the solenoid becomes very short maintaining consumption of electrical energy to a minimum. Another advantage arising from the elimination of a retaining mechanism for holding the armature in contact with the yoke is that the structure is so much simplified. Among others, a further advantage is that upon giving off the leading and trailing curtain start signals, the respective shutter curtain control electromagnets allow the armatures to be released from the latching connection to the yokes under the action of the pull-away springs, whereby, without the necessity of waiting until the advent of the signal representing the fact that the running down of the trailing curtain has been completed, or the shutter is closed, or until the corresponding return signal of the equivalent member appears, as soon as the pull-away spring ceases to operate as the drive spring, the attracting spring takes its place in bringing the armature into contact with the yoke for the leading and trailing curtains independently of each other so that as the confronting surfaces of the armature and yoke are exposed to air always in a very short constant period, the accumulation of dust, foreign particles, or oil fragments on the confronting surfaces can be prevented, and the reliability of opening and closing operation of the shutter can be remarkably improved. Further, in addition to the power of the drive spring for the shutter curtain, the repelling force of the armature pull-away spring also can be utilized in accelerating the shutter curtain before the border of the curtain comes across the exposure so that the curtain border runs down past the exposure aperture at more uniform speed than was heretofore possible. The use of the pull-away spring as the drive spring leads to a corresponding reduction of the mass of the parts concerned with the driving of the leading and trailing curtains of the shutter with an additional advantage that all the springs may be of small spring constant and each shutter curtain control electromagnet may be of weaker magnet force. Therefore, the weight and size can be minimized, and a light torque suffices. The operating noise also becomes lowered. Further, the parts for the leading and trailing curtains can be made common to each other and constructed in a simplified form, whereby the reliability of shutter operation is further improved, and the production cost can be reduced.

While a specific embodiment of the invention has been shown and described in detail to illustrate the application of the inventive principles, it will be understood that the invention may be embodied otherwise without departing from such principles.

What we claim:

1. An electromagnetically controlled shutter for a camera, comprising:

shutter blades for opening and closing an exposure aperture of said camera;

a shutter drive member for driving said shutter blades;

magnetic means including permanent magnets and electromagnets for controlling the operation of said shutter drive member, said electromagnets being operative upon energization thereof to cancel the magnetic force of said permanent magnets;

shutter latching means for latching said shutter drive members in positions which they occupy when attracted to said magnetic means;

a pull-away spring arranged to be engageable with said shutter drive member and said shutter latching means and to be charged with a working spring force when said shutter drive member is latched by said shutter latching member, whereby when said electromagnet is energized to cancel the magnetic force of said permanent magnets, said pull-away spring moves said shutter latching means from said magnetic means to release the shutter, and subsequently thereto, the remaining working spring force is imparted to said shutter drive member in a direction to accelerate the speed of movement of said shutter blades before said pull-away spring dissipates its working spring force; and attracting springs urging said shutter latching means in a direction to be attracted to said magnetic means, said springs causing said latching means to be returned to the attracted position to the permanent magnet of said magnetic means at the same time when the working spring force of said pull-away spring has been dissipated.

* * * * *